United States Patent [19]

Shinbrot

[11] Patent Number: 4,673,286
[45] Date of Patent: Jun. 16, 1987

[54] FRICTIONLESS VACUUM FEEDER FOR BOOK COPYING

[75] Inventor: Troy Shinbrot, Greenbelt, Md.

[73] Assignee: Xerox Corporation, Stamford, Conn.

[21] Appl. No.: 811,190

[22] Filed: Dec. 20, 1985

[51] Int. Cl.⁴ .............................................. G03B 27/32
[52] U.S. Cl. ......................................... 355/25; 355/82
[58] Field of Search .................................... 355/25, 82

[56] References Cited

U.S. PATENT DOCUMENTS

| | | | |
|---|---|---|---|
| 2,681,603 | 6/1954 | Grinten | 355/82 |
| 3,484,970 | 12/1969 | Berlinsky et al. | 40/104 |
| 3,550,296 | 12/1970 | Castagna | 40/104 |
| 3,800,453 | 4/1974 | Kroes | 40/104 A |
| 3,929,587 | 2/1976 | Westrom | 40/104 A |
| 4,102,071 | 7/1978 | D'Arcy | 40/531 |
| 4,121,361 | 10/1978 | D'Arcy | 40/470 |
| 4,160,334 | 7/1979 | Willis | 40/531 |

*Primary Examiner*—Monroe H. Hayes
*Attorney, Agent, or Firm*—William A. Henry, II

[57] ABSTRACT

An arrangement for turning pages of a facedown booklet for use with a copier. A rotating vacuum roll located between two platens peel pages from the book as the book is moved back and forth between the two platens. As the book moves over the vacuum roll, an air knife fluffs the pages and the page adjacent the vacuum roll is captured by the vacuum roll. As the book spine passes through the region between the platens, the vacuum roll reverses and with assistance from the air knife presses the captured pages against the other half of the book.

10 Claims, 6 Drawing Figures

FRICTIONLESS VACUUM FEEDER FOR BOOK COPYING

BACKGROUND OF THE INVENTION

Reference is hereby made to copending application Ser. No. 811,195, entitled "Platen Transport and Vacuum Plenum for Book Copying", filed on Dec. 12, 1985 in the name of Gerald M. Garavuso and Troy (NMI) Shinbrot; and Ser. No. 811,194, entitled "Page Flipper for Book Copying" filed on Dec. 20, 1985 in the name of Troy (NMI) Shinbrot which are incorporated herein by reference.

This invention relates generally to an electrophotographic copying machine, and more particularly, concerns a page turning apparatus for such a copying machine that peels paper from the bottom of a bound volume or book.

Present copier state of the art involves using a recirculating document handler to allow convenient copying of large stacks of original documents. These systems have no page turning arrangement to deal with copying books, magazines, saddle stitched sets, etc. Further, copying of bound documents is a labor intensive task making a device that is adapted to copy bound volumes more and more necessary to control costs, especially as finishing of copies into book volumes becomes more common. There is a clear present need to extend the state of the art to include this book copying segment of the market sector.

PRIOR ART

A number of page turner devices are available, however, they are usually designed to allow persons who are partially immobilized, disabled, or bed-ridden to turn pages of a book at will merely by operation of a switch. These devices are either too bulky, heavy, insufficiently reliable or incapable of being adapted to turn the pages of a book for book copying in a photocopying environment. For example: U.S. Pat. No. 3,484,970 (Berlinsky et al.)—discloses an automatic sheet turner that uses a rotating vacuum head to grab a page of a book and flip it over to the other side. Subsequently, a brush follows the path of the roller and sweeps and smooths out the turned page.

U.S. Pat. No. 3,550,296 (Castagna) and U.S. Pat. No. 3,800,453 (Kroes)—disclose page turner devices in which suction means are used to lift the pages of a book and flip them over.

U.S. Pat. No. 3,939,587 (Weststrom)—discloses a page turner in which a roller is moved from one side of an open book to the other. The unturned pages of the book are kept in position by means of two page retainers.

U.S. Pat. No. 4,102,071 (D'Arcy)—discloses an automatic page turning apparatus in which a roller forces a page of a book to separate and bow upwardly. Once the page reaches a certain position, the roller releases the page which flexes upwardly to be engaged by a band as the band returns to it forward position. Subsequently, blocks move downwardly to force the page to a subtantially flat position.

U.S. Pat. No. 4,121,361 (D'Arcy)—discloses an apparatus for automatically turning pages. A roller frictionally pushes an exposed page resulting in an upward bulging of the page, then a first flipper arm and a second flipper arm move under the bulge to assist in flipping the page over toward already turned pages.

U.S. Pat. No. 4,160,334 (Willis)—discloses a reversible page turner in which a roller causes the flipping of pages of a book.

SUMMARY OF THE INVENTION

Accordingly, a method for copying pages from a facedown book is disclosed comprising the steps of:

(a) providing two platen surfaces with a vacuum roll positioned therebetween with an area of said vacuum roll in the same horizontal plane as the platen surfaces and extending transverse thereto;

(b) providing an air knife adjacent one side of said vacuum roll for supplying an air bearing as well as to separate the pages of the book;

(c) capturing a page of the book by said vacuum roll;

(d) moving the book in said horizontal plane over said vacuum roll while simultaneously rotating said vacuum roll;

(e) reversing the rotation of said vacuum roll at the spine of the book to unwind the captured page while the book continues to be moved; and (f) returning the book to its initial position after the captured page has been unwound.

BRIEF DESCRIPTION OF THE DRAWINGS

Other advantages of the present invention will become apparent upon reading the following detailed description and upon reference to the drawings, in which.

While the present invention will be described hereinafter in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION OF THE INVENTION

Figure 1:
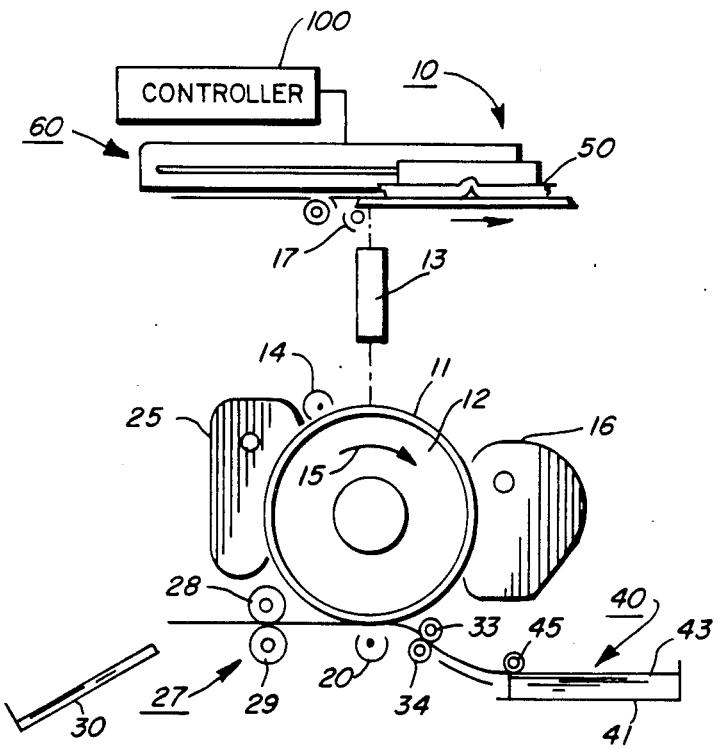
FIG. 1 is a schematic elevational view of an electrophotographic printing machine incorporating the features of the present invention.

For a general understanding of an electrophotographic printing machine in which the features of the present invention may be incorporated, reference is made to FIG. 1 which depicts schematically various components thereof. Hereinafter, like reference numerals will be employed throughout to designate identical elements. Although the apparatus for turning pages within a copier is particularly adapted for use in an electrophotographic copying machine of FIG. 1, it should become evident from the following discussion that it is equally well suited for use in a wide variety of areas and devices and is not necessarily limited in its application to the particular embodiments shown herein. For example, the apparatus of the present invention will be described hereinafter with reference to turning pages in a document for copying with a copier, however, the device could just as well be used for turning pages for reading by an individual who is disabled.

Since the practice of electrophotographic printing is well known in the art, the various processing stations for producing a copy of an original document are represented schematically in FIG. 1. Each processing station will be briefly described hereinafter.

As in all electrophotographic copying machines of the type illustrated, a drum or belt 12 having a photoconductive surface 11 entrained about and secured to the exterior circumferential surface of a conductive substrate is rotated in the direction of arrow 15 through the various process stations. Photoconductive surface 11 may be made from selenium and the conductive substrate on which it is mounted is usually made of aluminum.

Initially, the drum rotates a portion of photoconductive surface 11 through a charging station that employs a corona generating device 14 to charge conductive surface 11 to a relatively high substantially uniform potential.

Thereafter, the drum rotates the charged portion of photoconductive surface 11 to an exposure station shown generally as 13 and includes two stationary, transparent platens, such as a glass plates 65 and 66 against which pages of a book to be copied are placed. Lamps (one shown) illuminate the original document or pages. Scanning is achieved by means of a Selfoc lens in relationship with movement of the photoconductive surface 11 so as to create incremental light images onto the charged portion of photoconductive surface 11. Irradiation of the charged portion of photoconductive surface 11 records an electrostatic latent image corresponding to the informational areas contained within the original document.

The electrostatic latent image recorded on photoconductive surface 11 is now rotated toward developing unit 16 which includes a housing with a supply of developer mix contained therein. The developer mix comprises carrier granules with toner particles adhering triboelectrically thereto. Preferably, the carrier granules formed from a magnetic material with the toner particles being made from a suitable plastic. Developing unit 16 is preferably a magnetic brush development system. A system of this type moves the developer mix through a directional flux field to form a brush thereof. The electrostatic latent image recorded on the photoconductive surface 11 is developed by bringing the brush of developer mix into contact therewith. In this manner, the toner particles are attracted electrostatically from the granules to the latent image forming a toner powder image on photoconductive surface 11.

With continued reference to FIG. 1, a copy sheet is advanced by sheet feeding apparatus 40 to a transfer unit 20. Sheet feeding apparatus 40 advances successive copy sheets to registration rollers 33 and 34. Registration roller 34 is driven by a motor (not shown) in the direction of the transfer station and drives idler roller 33 as well as sheets 43 toward photoconductive surface 11 in timed relation to an image on the photoconductive surface 11.

Continuing now with the various processing stations, transfer station 20 includes a corona device for transferring an image from photoconductive surfaced 11 to copy sheet 43. For transfer, the corona generating device applies a spray of ions to the backside of the copy sheet. This attracts the toner powder from the photoconductive surface 11 to the copy sheet.

After transfer of the toner powder image to the copy sheet, the sheet is detacked from the photoconductive surface 11 and then advanced by suitable means to fuser apparatus 27.

Fuser apparatus 27 includes a fuser roll 28 and a backup roll 29 defining a nip therebetween through which the copy sheet passes. After the fusing process is completed, the copy sheet is advanced by suitable means to an output catch tray 30.

After the copy sheet is separated from photoconductive surface 11 some residual toner particles remain adhered thereto. These toner particles are removed from photoconductive surface 11 by a cleaning unit 25. Cleaning unit 25 includes a doctor blade that cleans the toner particles from the photoconductive surface 11.

It is believed that the foregoing description is sufficient for purposes of the present application to illustrate the general operation of an electrophotographic copying machine. Referring now to the specific subject matter of the subject invention, FIG. 2 depicts the page turner apparatus in greater detail.

Figure 2:
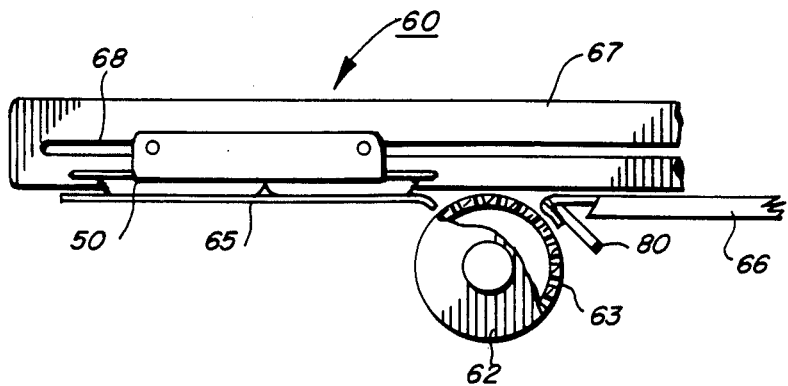
FIG. 2 is a partial enlarged elevational schematic of the page turner device of the present invention.

Referring now to FIG. 2, the detailed structure and operation of the present page turner apparatus 60 will be described. A platen 65 is shown in FIG. 2 supporting a facedown open book 50 that is pressed against platen 65 by means of a housing 67. A handle 68 is shown on housing 67 in order that it can be lifted for single sheet copying or removed when not needed. A vacuum wheel or vacuum roll 62 is shown in the same plane of and at the right hand end of platen 65. An air knife 80 is positioned immediately adjacent to and in a position at the upper right hand side of vacuum wheel 62 for separating and fluffing sheets in book 50 as it passes thereover. If desired, air knife 80 could be replaced with a paddle wheel. A second platen 66 is positioned in the same plane as platen 65 and adapted to support book 50 for copying. Housing 67 is adapted to be translated from left to right past vacuum wheel 62 in order to move book 50 from a position to the left vacuum wheel 62 and resting on platen 65 to a position to the right of vacuum wheel 62 and resting on platen 66. Housing 67 is moved from left to right and back to left for each page that is to be turned in book 50. Vacuum wheel 62 has openings 63 therein for communication with a negative pressure source as well as pages to be drawn to the surface of the vacuum wheel.

As shown in FIGS. 3A through 3D, bound volume 50 is initially supported by left platen 65 and when turning of a page is initiated automatically by the machine controller or by an operator, housing 67 is moved to the right bringing the right hand side of book 50 into contact with vacuum wheel 62. Air knife 80 at this time provides an air bearing for book 50 and in addition, provides a fluffing action to the right hand side of the book in order to assist vacuum wheel 62 in separating the bottommost page from the rest of the pages. Also, at this time vacuum wheel 62 initially captures the bottom page of the right hand side of the book.

Figure 3A:
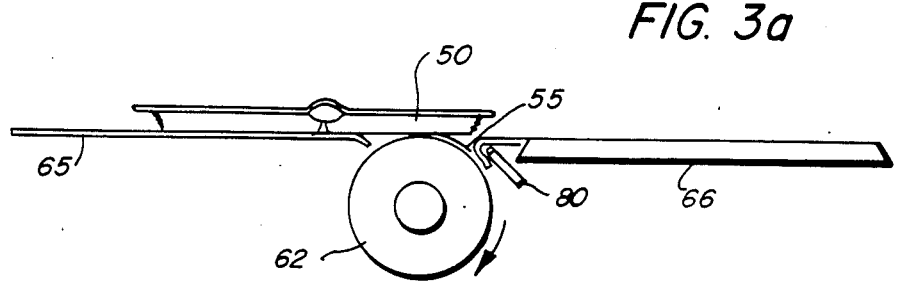
FIG. 3A is a partial elevational view of the page turner of the present invention showing a vacuum wheel as well as two platens which hold the book that is to be copied on either side of the vacuum wheel.
Figure 3B:
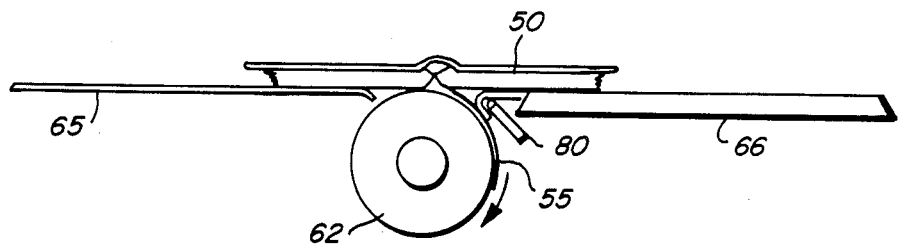
FIG. 3B is a partial side view showing the vacuum wheel of the present invention rotating in a clockwise direction peeling the bottommost page from a facedown book with the assistance of a separation air knife.
Figure 3C:
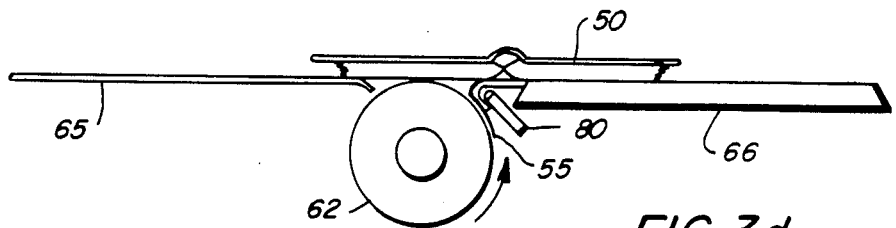
FIG. 3C shows a partial side view of the vacuum wheel of the page turner device of the present invention of FIG. 3B in the process of reversing its direction of rotation in order to place the peeled sheet against the opposite side of the book.
Figure 3D:
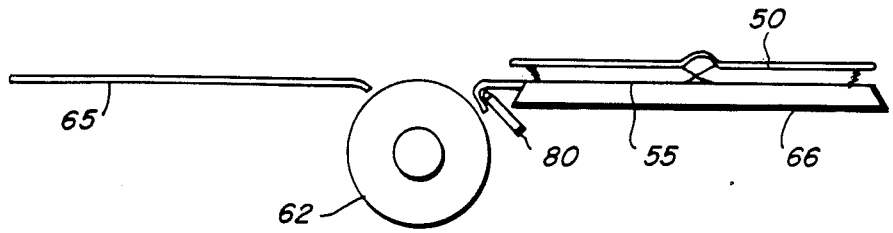
FIG. 3D is a partial side view of the page turner apparatus of the present invention showing the facedown book in its copying position.

As shown in FIG. 3B, vacuum wheel 62 attracts the bottommost page in book 50 to its outer periphery and rotates under the influence of conventional means in a clockwise direction until the spine of the book reaches the center area of the vacuum roll. Thereafter, as shown in FIG. 3C, vacuum roll 62 is reversed in order to now place the peeled page back against the opposite side of the book. Air knife 80 assists in this operation by blowing against the backside of the page and compressing it against the bottom of the left hand side of the book. All the while this action is taking place, housing 67 is moving book 50 toward platen 66. In FIG. 3D, book 50 has been moved completely onto platen 66 and copied by the use of a Selfoc lens apparatus. Exposure could be arranged to take place on both platens instead of one platen as disclosed herein, if one desired. The book is translated back onto the platen 65 for additional page turning.

The page turning apparatus 60 is controlled by a microprocessor control 100 which is of the type shown in U.S. Pat. No. 4,116,558 which is incorporated herein by reference. It is possible with the present invention to use the microprocessor to control the page turner such that different pages can be selected for copying. For example, sensors and counters could be mounted on the page turner device and used to sense the presence of pages and to count pages turned in order to present for copying the desired page(s).

In operation, a page is stripped from the bottom of book 50 by vacuum roll 62 as the book moves to the right in FIG. 2 under the influence of housing 67. If one desired, housing 67 could be replaced by a pair of belts. During this movement of book 50 an air knife has been applying a pressure to the lead edge of the right hand side of the book to separate the pages and to press the first page, that is, the bottommost page in the book against vacuum wheel 62. Continued movement of housing 67 and rotation in a clockwise direction of vacuum wheel 62 causes the bottommost page of the right hand side of the book to adhere as well as wrap around the outer surface of vacuum wheel 62. At this time, the platen 66 on the right is beginning to support the book 50. In approximately the center of the book or at the spine of the book, vacuum wheel 62 begins to rotate in a reverse or counterclockwise direction and as the book is continued in movement toward full support onto platen 66, vacuum wheel 62 in conjunction with air knife 80 places the page attached to the outer surface of the vacuum wheel 62 onto the bottom of the left hand side of the book. In the present embodiment, by the time housing 62 has traversed to its right hand position, the pages of book 50 positioned adjacent glass platen 66 have been exposed by the Selfoc lens apparatus and imaged onto photoconductive surface 11. Air knife 80 lubricates the bottom of the book as it is being reversed by housing 67.

It should now be apparent that a device for automatically turning pages of a facedown book for use with a copier is disclosed. The device peels pages from the bottom of a book as the book moves back and forth between two platens with a rotating vacuum roll and air knife positioned between them. As the initial book edge moves over the vacuum roll, the air knife fluffs the pages and the lowest page is captured by the vacuum roll. As the book spine passes through the region between the platens, the roll reverses and the air knife presses the page attached to the vacuum roll against the back half of the book. The book is automatically returned to its home position once copying is completed. Since various modifications are contemplated, it is to be understood that within the scope of the appended claims, the invention may be practiced otherwise than is specifically described.

What is claimed is:

1. A method for copying pages from a book, comprising the steps of:
    (a) providing two platen surfaces with a vacuum roll positioned therebetween with an area of said vacuum roll in the same horizontal plane as the platen surfaces and extending transverse thereto;
    (b) providing an air knife adjacent one side of said vacuum roll for supplying an air bearing as well as to separate pages of the book;
    (c) capturing a page of the book by said vacuum roll;
    (d) moving the book in said horizontal plane over said vacuum roll while simultaneously rotating said vacuum roll;
    (e) reversing the rotation of said vacuum roll at the spine of the book to unwind the captured page while the book continues to be moved; and
    (f) returning the book to its initial position after the captured page has been unwound.

2. The method of claim 1, including the steps of pressing the page back against the book during step (e) with said air knife.

3. The method of claim 1, including the step of exposing the pages of the book incrementally for copying as the book passes the vacuum roll.

4. The copier of claim 1, wherein said transport means returns the book to its original position once the captured page has been copied.

5. The copier of claim 4, including fluffing means for separating the bottommost page from the remaining pages of the book.

6. The copier of claim 5, wherein said fluffing means is an air knife.

7. The copier of claim 5, wherein the pages of the book are projected onto said photoconductive surface incrementally.

8. The copier of claim 5, wherein said air knife means is used to press the captured page back against the second half of the book after the captured page has been turned.

9. The copier of claim 8, wherein said transport means is mounted in a modular removable housing adapted to be lifted away from the copier for storage when not in use.

10. A copier including an apparatus for turning pages of a facedown book for copying, comprising:
    first platen means for supporting the book from which copies are to be made facedown;
    second platen means adapted to allow images from pages of the book to be projected through a lens system to a photoconductive surface;
    transport means adapted to move the book in a horizontal plane from said first platen onto said second platen; and
    vacuum roll means positioned between said first and second platens and extending transverse thereto, said vacuum roll being adapted to rotate and capture the bottommost page of a first half of the book as the book is transported thereover by said transport means, and
    wherein said vacuum roll means reverses its rotation at the spine of the book to unwind the captured page onto a second half of the book while the book is still being moved by said transport means.

* * * * *